Patented May 26, 1953

2,639,986

UNITED STATES PATENT OFFICE 2,639,986

METHOD IN SULFITE PULPING FOR OBTAINING CONCENTRATED WASTE LIQUOR

Gunnar Kyrklund, Kuusankoski, Finland, assignor to Kymin Osakeyhtio-Kymmene Aktiebolag, Kuusankoski, Finland, a corporation of Finland No Drawing. Application September 3, 1947, Serial No. 772,019. In Sweden July 20, 1940

Section 1, Public Law 690, August 8, 1946
Patent expires July 20, 1960

3 Claims. (Cl. 92—11)

This invention relates to methods for the forming of sulfite pulp and is particularly concerned with the raising of the organic substance content of waste liquor to a higher degree than that which results from normal one stage cooking. The invention is also concerned with the digestion of pine and other resinous species of wood.

Methods have heretofore been proposed for the recovery of substances deleterious to fish and contained in waste liquor from the sulfite process going into the drains. The slight concentration of normal waste liquors (approximately 11–13.5 gms. of evaporation residue per hundred ccm. of liquor), rendered such methods economically impracticable. Furthermore, the methods heretofore known for rendering such liquor more concentrated have introduced defects which render their utilization for the purpose in question impossible. The method of the instant invention was developed specifically for and provides a solution to this problem.

Prior attempts for promoting the dry substance content of waste liquors by utilizing in the preparation of cooking acid the wash liquors from a preceding cook have, however, yielded no results because increase of liquor in the digester or in acid preparation ultimately leads to "burning." Transition from lime to alkali bath has not markedly enhanced stability but on the contrary complicated the process and raised the expenses thereof in a great degree. For this reason and under all circumstances it has been deemed necessary to prepare the acid from pure water at least in some part of the cooking phase and in this way dilute the digester contents and thereby act directly contrary to the desired result. The Swedish Patents Nos. 92,236, 93,021 and 98,779 are of special interest for according to them the waste liquor is withdrawn after the first phase, in which cooking also can take place with acid prepared from waste liquor of a preceding digestion. However the object of this method is the extraction of as much sugar as possible without consideration for the other organic substances contained in the liquor. For preventing the breakdown of sugars, the pre-digestion process is discontinued as soon as the sugars have gone into solution and before the materials begin to defibrate, i. e. before the majority of non-celluloses, i. e. lignin substances, begin to go into the solution. Therefore no marked increase of the dry substance content in the liquor withdrawn subsequently to the first phase is noted. Moreover when the last traces of sugars are recovered by subjecting the pulp in the digester to another extraction before commencement of the second cooking phase, the total liquid amount thus obtained increases and despite the good sugar yield the dry substance content in the extracted liquor remains approximately the same as in a normal cook.

Contrary to the hereinabove described prior methods the principle of the present cooking process is that the liquor concentration as regards organic substances is at its highest at the end of the pre-digestion. This is achieved according to the present cooking process in two stages, pre-digestion and final digestion, and consists in that that in preparing cooking acid for pre-digestion the liquor drained from the final digestion of a preceding cooking process is utilized. This liquor from the final digestion of a preceding cook is admixed according to need with the requisite amount of lime or some other base and fortified with $SO_2$ to the required strength. The predigestion is continued until the majority of the cellulose materials have dissolved and the predigestion has been completed, at which time the liquor intended to be evaporated or subjected to some other after treatment is drained off. Following the withdrawal of said liquor, the necessary amount of fresh cooking liquor is introduced into the cook and the final digestion is continued. Herein all danger of "burning" is eliminated by raising the liquor concentration to its highest already in the first cooking stage, which fact does not occur in the heretofore known methods, and then this high concentration liquor is withdrawn as soon as the majority of organic materials has dissolved but before the pulp has attained its full ripeness. The amount of liquor to be drained depends on the degree of pulp digestion and must be conducted so that in the digester there remains sufficient liquor with high dry-substance content to meet the demands for pulping acid for the subsequent first-cooking phase.

According to a preferred embodiment of this invention the acid addition for the final digestion is prepared from the wash-water of a previous final digestion. The more wash water utilized by introduction into the process the greater the dry-substance yield and the less the waste going into water drains.

On applying the process to the digestion of normal spruce e. g. the digester is charged in the ratio of 1:4.5 kg. wood (calculated as absolutely dry) to liter acid and said acid is prepared from old waste liquor containing about 11 gms. evaporation residue per 100 ccm. fortified with $SO_2$ and admixed with lime as for a normal sulfite cook. The cooking process continues then quite normally until the nearest desired digestion degree is attained and the majority of the cellulose materials have defibrated, at which the liquor will contain about 21–22 gms. evaporation residue per 100 ccm., depending on the initial moisture of the wood and the digestion degree desired in the ready pulp. From this concentrated liquor a quantity corresponding to approximately 4 $m^3$ per calculated tons yield 90 percent chemical pulp is discharged, which liquor subsequent to degasification and utilization of said gases as usual is conducted to be treated subsequently, e. g. evaporated. After the liquor is discharged from the digester, the final acid prepared from the wash water of a previous cook containing about 4 gms. evaporation residue per 100 ccm. is pumped in. In this case, however, the final acid need not be fortified more than to about 2.75 to 3.0% total $SO_2$ and the lime content is kept at only about 0.3% without risk of "burning." Cooking is then carried on till full ripeness is attained, after which the liquor is blown down with wash water from a preceding cook. The liquor as well as a part of the blow-down liquid, all together about 8 $m^3$ per ton chemical pulp, and containing about 11 gms. evaporation residue per 100 ccm., is pumped to pre-acid cisterns for the preparation of fresh pre-acid. After this the digester is dumped and of the first wash water from the blow-pit about 5 $m^3$ per ton chemical pulp is pumped over to the final acid cisterns for the preparation of final acid, after which a further amount of about 5–10 $m^3$ wash water is utilized for blowing down or washing out the subsequent cook.

Because the cooking acid for pre-digestion already at the beginning of the cooking process contains great amounts of dissolved organic substances (e. g. about 10–11 gms. per 100 ccm.) and pre-digestion is carried so far that the majority of non-celluloses dissolve from the chips, the liquor (A-liquor) to be evaporated or subjected to some other subsequent treatment can have an evaporation residue of 20 gms. or more per 100 ccm. liquor, so that in order to obtain 1 kg. 50 percentage thickly liquor it is only necessary to drive out 1.74 kg. water, while previously it was essential to evaporate 2.93 kg. water for every kg. 50 percentage thickly liquor obtained from normal sulfite liquors with evaporation residue of 13.5 gms. per 100 ccm.

In order to obtain the requisite concentration in the pre-acid, all of the A-liquor must not, however, be discharged from the digester but only a predetermined amount calculated from the relationship between the wood and acid introduced into the digester the properties of the chips, the desired degree of digestion, the desired concenration of the waste liquor, inter alia. So much strong A-liquor must be left that this amount as well as the substances dissolved from the chips and the materials possibly introduced with the final acid make up a waste liquor (B-liquor) of sufficiently high concentration, in order that after dilution on blowing down a requisite amount of liquor mixture (corresponding to a fresh cook) e. g. with evaporation residue of about 10–11 gms. per 100 ccm. is obtained.

On the other hand the final digestion is carried out with an acid-admixture containing considerably less organic materials than the pre-acid (as a rule at the most about 3–4 gms./100 ccm.) and when only minor amounts of undissolved substances remain in the as a rule almost ready-digested pulp, the therein contained strong A-liquor is easily extracted during the final cook and the ripening of cellulose runs quite normally and in a liquor which does not deviate much from normal waste liquor (about 15 gms. evaporation residue/100 ccm.).

The most rational way is to push away the waste liquor after the final cook (B-liquor) in the known manner with wash-water from a previous cook. After the requisite quantity of waste liquor has been pumped over to the depository cisterns or to cisterns where pre-acid is prepared for subsequent cookings, the washing process is continued either by introducing more water into the digester or after blowing into the blow pit, from where the requisite quantity of wash-water in the case in question is pumped over to the final-acid cisterns, where acid for the final cook is prepared. Moreover the wash-water, corresponding substantially to a half acid-charge, must be utilized to push away the B-liquor in the subsequent cook. The requisite lime (in case no other base is used) can appropriately be introduced in the form of lime milk prepared with waste liquor or wash water.

By carefully utilizing the wash-water and since no fresh water is introduced directly into the cooking acids, the advantage is gained that the waste-water ultimately going into the water drain contins only minute amounts of organic substances and only traces of sulfur-containing materials, while the absolute yield of recovered organic substances is increased by about 30 per cent.

Moreover in digesting resinous species of wood attention is called to the advantage of a rapid gasing (relief) simultaneously with the withdrawal of A-liquor, which in a great degree decrease the resin content in the obtained chemical pulp and simultaneously facilitates the final extraction.

It is obvious that changes in the embodiment of this process may be made without deviating from the scope and spirit of the annexed claims. Thus, e. g. the base or $SO_2$ introduction can be accomplished in different, prior known ways, or the quantity of A-liquor and moment for its withdrawal can be slightly varied depending e. g. on whether highest possible liquor concentration or greatest possible absolute yield of organic substances is aimed at.

What I claim is:

1. A two stage method for the production of sulfite pulp, including a pre-cook and a final cook, from resinous wood, for obtaining a higher concentration of organic materials in the waste liquor than in one-stage cooking, which includes, preparing the cooking acid for the pre-cook by withdrawing liquor from the final cook of a preceding cook, mixing the requisite amount of a suitable base to said liquor and fortifying such liquor with $SO_2$ to create the required strength, digesting the majority of cellulose materials of said wood by precooking the same in fortified liquor, withdrawing waste liquor from said precook after completion of the precook, limiting the quantity of said waste liquor so withdrawn in order to maintain the concentration of waste liquor pushed out of said final cook approximately the same as that of the waste liquor from an ordinary one-stage cook, introducing new cooking acid, carrying out the final cook in said new cooking acid, and using said waste liquor from said final cook in forming the cooking liquor for a subsequent pre-cook to obtain a higher concentration of organic materials in the waste liquor from said subsequent precook.

2. A two stage method for the production of sulfite pulp, including a pre-cook and a final cook, from resinous wood, for obtaining a higher concentration of organic materials in the waste liquor than in one-stage cooking, which includes, preparing the cooking acid for the pre-cook by withdrawing liquor from the final cook of a preceding cook, mixing the requisite amount of a suitable base to said liquor and fortifying such liquor with $SO_2$ to create the required strength, digesting the majority of cellulose materials of said wood by precooking the same in fortified liquor, withdrawing sufficient of said waste liquor from said pre-cook, after completion of said pre-cook, that the concentration of the waste liquor pushed out of said final cook becomes approximately 11–12 gms. per 100 ccm., introducing new cooking acid, carrying out the final cook in said new cooking acid, and using said waste liquor from said final cook in forming the cooking liquor for a subsequent pre-cook to obtain a higher concentration of organic materials in the waste liquor from said subsequent pre-cook.

3. In a two stage method for the production of sulfite pulp, including a pre-cook and a final cook, from resinous wood, for obtaining a higher concentration of organic materials in the waste liquor than in one stage cooking which includes, preparing the cooking acid for the pre-cook by withdrawing liquor from the final cook of a preceding two stage cook, mixing the requisite amount of suitable base to said liquor and fortifying such liquor with $SO_2$ to create the required strength, digesting the majority of cellulose materials of said wood by precooking the same in fortified liquor, withdrawing the waste liquor from said pre-cook after the majority of cellulose materials have been digested, introducing new cooking acid, carrying out the final cook in said new cooking acid, drawing off and recovering sufficient wash water from a final cook for the preparation of acid for a subsequent final cook and retaining a portion of the wash water from said cook, employing some of said retained portion of said wash water for forcing the waste liquor out of the digestor of a subsequent final cook and employing said waste liquor so forced out for the preparation of a pre-cook acid.

GUNNAR KYRKLUND.

References Cited in the file of this patent

UNITED STATES PATENTS

| Number | Name | Date |
|---|---|---|
| 329,215 | Ritter et al. | Oct. 27, 1885 |
| 951,317 | Kennedy | Mar. 8, 1910 |
| 1,130,192 | Oman | Mar. 2, 1915 |
| 1,560,881 | Ulmen et al. | Nov. 10, 1925 |
| 1,645,754 | Howell | Oct. 18, 1927 |
| 1,846,511 | Darling | Feb. 23, 1932 |
| 2,029,360 | Dean | Feb. 4, 1936 |

FOREIGN PATENTS

| Number | Country | Date |
|---|---|---|
| 20,392 | Finland | May 30, 1945 |
| 44,954 | Norway | Dec. 28, 1931 |